United States Patent

[11] 3,581,579

| [72] | Inventors | Albertus E. Schmidlin<br>Caldwell;<br>John L. Evans, Oakland, both of, N.J. |
|---|---|---|
| [21] | Appl. No. | 745,488 |
| [22] | Filed | July 17, 1968 |
| [45] | Patented | June 1, 1971 |
| [73] | Assignee | Singer-General Precision, Inc.<br>Little Falls, N.J. |

[54] FLUIDIC ACCELEROMETER
10 Claims, 3 Drawing Figs.

[52] U.S. Cl. .................................................. 73/515,
235/201
[51] Int. Cl. .................................................. G01p 15/10
[50] Field of Search .......................................... 73/515,
516, 517 AV; 137/81.5; 235/201

[56] References Cited
UNITED STATES PATENTS
3,019,641  2/1962  Shapiro ....................... 73/517X OTHER REFERENCES
A test entitled "Introduction to Theoretical Mechanics" by R. A. Becker, McGraw-Hill Book Company, Inc., 1954. Pages 370— 372. (Copy in Group 280 - L. Franklin).

Primary Examiner—James J. Gill
Attorneys—S. A. Giarratana, G. B. Oujevolk and S. M. Bender ABSTRACT: An accelerometer comprising a string suspended between a mass and a housing, the mass being movable with respect to the housing in response to acceleration to vary the tension on the string. A jet pipe, which has a fluid supply, is provided to vibrate the string. A receiver, which has a counter, is provided to measure the frequency of the vibration to give an indication of acceleration. The receiver has a pair of fluid inlet chambers, which receive respective portions of the fluid flow that is emitted by the jet pipe. The string is disposed between the jet pipe and the receiver in the path of the fluid flow for controlling the portions of the fluid flow.

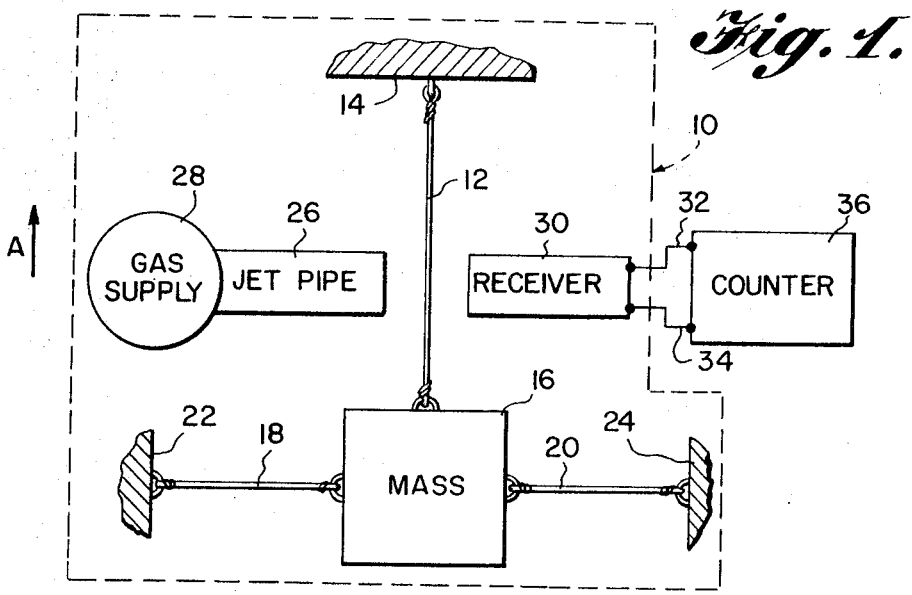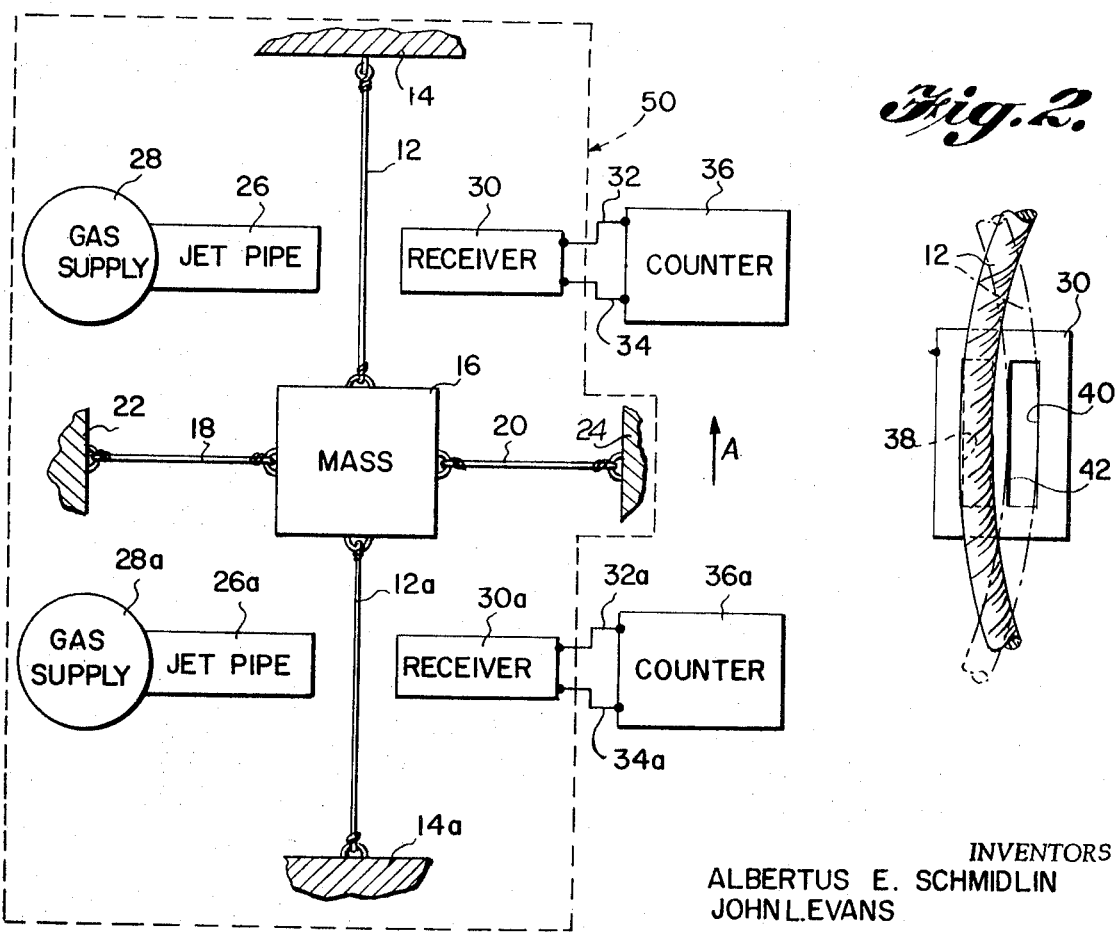
INVENTORS
ALBERTUS E. SCHMIDLIN
JOHN L. EVANS
BY  S. A. Giamatana
ATTORNEY 3,581,579

FLUIDIC ACCELEROMETER

BACKGROUND OF THE INVENTION

This invention relates to a device for measuring the acceleration of a vehicle or the like and, more particularly, to such a device utilizing a fluid flow across a vibrating string.

It has been proposed to utilize fluid control devices to measure acceleration. These devices usually consist of a moving member which is disposed in a path of flowing fluid and which distributes the fluid into separate paths in accordance with the applied acceleration. However, these known devices usually require precisely machined parts and, in some instances, a fluidic control circuit. Furthermore, they have a relatively low frequency response and are relatively unstable due to their sensitivity to temperature changes.

BRIEF SUMMARY OF THE INVENTION

It is therefore an object of the present invention to provide a fluid accelerometer which utilizes a structure that does not have to be precisely machined, which is insensitive to temperature changes.

Briefly summarized, the fluid accelerometer of the present invention utilizes a string which is suspended between a mechanical ground and a mass so that, upon acceleration, the movement of the mass varies the tension of the string and therefore its natural frequency, with means being provided to convert this change in frequency to a measurable output.

BRIEF DESCRIPTION OF THE DRAWINGS

Reference is now made to the accompanying drawings for a better understanding of the nature and objects of the fluidic accelerometer of the present invention, which drawings illustrate the best mode presently contemplated for carrying out the objects of the invention and its principles, and are not to be construed as restrictions or limitations on its scope. In the drawings:

FIG. 1 is a diagrammatic view of the accelerometer of the present invention;

FIG. 2 is a front elevational view showing the position of the vibrating string with respect to the end of the receiver of the accelerometer of the present invention; and FIG. 3 is a diagrammatic view similar to FIG. 1 but showing an alternate embodiment of the present invention.

DESCRIPTION OF THE PREFERRED EMBODIMENTS

Referring specifically to FIG. 1 of the drawings, the reference numeral 10 refers to the accelerometer of the present invention, which utilizes an elongated member, such as a string 12 suspended between a mechanical ground 14 and a mass 16, the connections between the string and the mechanical ground, and between the string and the mass being made in any known manner such as by tying the string around a ring formed on the mass and the ground, as shown.

The above arrangement is such that the mass 16 is suspended by the string for movement along the sensitive axis of the accelerometer, which is in a vertical direction with reference to FIG. 1. The mass 16 is restrained for movement in a horizontal direction by a pair of strings 18 and 20 in tension which connect the mass to a pair of mechanical grounds 22 and 24, as shown. It is understood that the mechanical grounds 14, 22 and 24 can form a housing, or the like, which completely encloses the structure of the accelerometer.

Since the natural frequency of a vibrating string is proportional to the square root of its tension, it is clear that, by varying the tension on the string 12, its frequency of vibration can be made to vary accordingly. Therefore, movement of the accelerometer 10 in a direction along its sensitive axis in response to an acceleration, such as in the direction A, for example, will cause the mass 16 to move in an opposite direction with respect to the housing, and exert an increased force on the string which will increase its tension and therefore its frequency of vibration.

Means to vibrate the string 12 and to measure its change in frequency are also shown diagrammatically in FIG. 1, and include a jet pipe 26 which receives a quantity of compressible fluid, such as gas, from a supply 28 and discharges a jet of the fluid over the string 12 and into a receiver 30. It is generally known that when a compressible fluid flows transversely over a cylinder, vortices are formed in the wake. For a rigid cylinder, these vortices are shed periodically in an alternating clockwise and counterclockwise direction. If the natural frequency of the string and the fluid jet are designed in resonance, a coupling of the jet with the string will occur, due to the periodic variation of the aerodynamic flow field with the physical displacement of the string. Therefore, the jet of fluid is designed to drive the string by causing it to vibrate at its natural frequency. The frequency of the vortices match the resonant frequency of the string 12. As the fluid flow passes over string 12, eddies are formed on each side of string 12. At a resonant flow velocity, the eddies become unstable, first vibrating irregularly and then breaking away alternately from the two sides of string 12. The eddies break off in periodic fashion. This is called the "Karmin vortex trail." Behind the cylindrical string, there is formed a staggered stable arrangement or trail or vortices. The alternate shedding produces a periodic force acting on the cylindrical string 12 normal to the undisturbed flow. Thus, at a certain flow velocity, which is the resonant flow velocity, string 12 deflects back and forth at a set frequency in a direction transverse to the direction of fluid flow. String 12 deflects in this way because the vortices from alternately at the opposite sides of string and act like small, alternate impact forces which keep string 12 deflecting back and forth. In this way, the action of the vortices cause the resonant deflection of string 12, and the frequency of the vortices match the resonant frequency of string 12. It is also noted that jet pipe 26 provides a uniform, nonpulsing flow to string 12 at the desired resonant flow velocity which keeps string 12 deflecting at the resonant frequency of string 12. The above-described vortex trail phenomena is described and illustrated in the text entitled, "Advanced Fluid Mechanics," Volume 1, R. C. Binder, Prentice Hall, 1958, pages 91 through 92.

The resonant frequency of string 12 changes slightly due to a slight change in tension in string 12. The resonant or natural frequency of string 12 by conventional formula is proportional to the square root of the tension in string 12 divided by the string length for a constant density. Thus, if the string tension varies slightly, the string frequency also varies slightly by the square root of the string tension, even though the fluid flow resonant velocity remains unchanged. This change in string frequency due to a change in string tension at a constant fluid flow velocity occurs over a relatively small range in string frequency. This change in string frequency remains in the range of the resonant string frequency. The frequency of the formation of the vortices remains the same as the string resonant frequency so that there is a slight change in the vortices formation frequency or pulsating flow with the slight change in string frequency at the constant fluid flow velocity. Thus, the change in vortices formation frequency is substantially the same as the change in string resonant frequency due to a change in string tension at a substantially constant fluid flow velocity. The frequency change in vortices formation or pulsating flow behind string 12 is measured by receiver 30, while the substantially constant fluid flow velocity toward string 12 is provided by jet pipe 26. In summary, the resonant frequency of string 12 is the frequency of the driving force, which is the periodic force of the vortex trail acting on the string 12. In addition, the actual size of the string resonant frequency varies with the actual size of the string tension within a narrow range of frequency. The string resonant frequency change, which is proportional to the tension force change, is measured by receiver 30.

The receiver 30 may be of any known design, such as that disclosed by U.S. Pat. application Ser. No. 642,742, filed June 1, 1967 and, in general, includes two chambers 38 and 40, as shown in FIG. 2, divided by a splitter 42 extending vertically across the mouth of the receiver. Therefore, the vibratory motion of the string periodically obstructs the chamber 38, as shown by the solid line in FIG. 2, and the chamber 40, as shown by the dotted lines, causing an alternating pulsating flow of fluid to the chambers. The receiver 30 converts this input to a measurable output in the form of a sine wave whose frequency is that of the vibrating string. This output is fluidically connected by means of a pair of connectors 32 and 34 to a counter 36 which is adapted to count the frequency and quantity of the pulsating flow. Although the counter 36 is shown positioned externally to the remaining structure of the accelerometer, it is understood that it may also be enclosed within the housing formed by the mechanical grounds 14, 22 and 24.

In operation, a jet of gas is continuously discharged from the jet pipe 26, to cause the string 12 to vibrate, as discussed above. Movement of the mass 16 with respect to the housing of the accelerometer in either direction in a vertical plane in response to acceleration will cause the oscillatory frequency of the system to change, resulting in a variation of the pulsating flow of fluid into the chambers 38 and 40. The frequency and quantity of the change in pulsating flow will register on the counter 36, the frequency of pulses being proportional to acceleration, and the total number of pulses being proportional to velocity.

An alternate embodiment of the present invention is shown with reference to FIG. 3. In particular, an accelerometer 50 is shown which includes a structure which is identical to that shown in connection with the embodiment of FIGS. 1 and 2, and which is therefore given the same reference numerals. In addition, a string 12a is provided which extends from the side of the mass 16 opposite that of the string 12, and a jet pipe 26a is provided adjacent the string 12a to receive a supply of fluid from the supply 28a and discharge the same to vibrate the string 12a in the same manner as discussed above.

Upon acceleration of the accelerometer 50 in a direction along its sensitive axis, such as in the direction indicated by the arrow A, for example, the movement of the mass 16 with respect to the accelerometer housing will increase the tension on the string 12 and decrease the tension on the string 12a. Therefore, the vibration frequency of the string 12 will increase, while that of the string 12a will decrease in response to the discharge of the fluid across the strings from the jet pipes 26 and 26a. This, in turn, will increase the frequency of the gas flow into the receiver 30, and decrease the frequency of the gas flow into the receiver 30a. The counters 36 and 36a will then provide a differential count of pulsating fluid flow through the receivers 30 and 30a, both in frequency and quantity, which will provide a measure of acceleration and velocity, respectively.

It is thus seen that the accelerometers of the present invention are simple in structure and operation, do not require precisely machined parts or a control circuit, have a relatively high frequency output, and are stable in operation.

Of course, variations of the specific construction and arrangement of the fluidic accelerometer disclosed above can be made by those skilled in the art without departing from the invention as defined in the appended claims.

We claim:

1. A device for measuring acceleration, said device comprising a housing, at least one elongated member fixed at one end to said housing, said elongated member having an outer surface having a selective profile, means to apply a tension to said elongated member which is variable in response to acceleration, means to vibrate said elongated member, said means to vibrate said elongated member comprising means to discharge a fluid jet over said surface of the elongated member, said fluid jet having a selective fluid flow velocity, said elongated member having selective dimensions whereby said elongated member is operative to vibrate at a resonant frequency when subject to said fluid jet at said fluid flow velocity, and means to measure the frequency of vibration.

2. The device of claim 1 wherein said elongated member is a string, said string having an outer surface having a substantially cylindrical profile.

3. The device of claim 1 wherein said means to apply a tension to said elongated member comprising a mass fixed to the other end of said elongated member for movement with respect to said housing in response to acceleration, said mass having a selective size whereby the change in tension in said elongated member at said acceleration causes a corresponding change in said string resonant frequency.

4. The device of claim 3 further comprising means restraining said mass against movement in a direction perpendicular to the direction of acceleration.

5. The device of claim 1 wherein said means to discharge a fluid jet over said string includes a jet pipe having a gas supply.

6. The device of claim 5 wherein said fluid jet at said selective fluid flow velocity is operative to cause a vortex trail in the fluid flow behind said elongated member, said vortex trail being operative to cause a periodic force casing on the elongated member normal to the direction of fluid flow whereby the natural frequency of said fluid jet and said elongated member are in resonance.

7. The device of claim 5 wherein said means to measure the frequency of vibration comprises a receiver for receiving the fluid from said fluid jet after the fluid has passed over said elongated member, said receiver including at least one chamber having a mouth which is at least partially obstructed by said elongated member during its vibratory movement, to effect pulsating flow of fluid into said chamber.

8. The device of claim 7 wherein said means to measure the frequency of vibration further comprises means to count the pulsating flow of said fluid through said chamber.

9. The device of claim 8 wherein said receiver includes two chambers, each having a mouth which is at least partially obstructed by said elongated member during its vibrating movement.

10. The device of claim 1 wherein there are two elongated members, said means to apply a tension being fixed to the other end of each of said elongated members, a means to vibrate said elongated members and a means to measure the frequency of vibration being associated with each of said elongated members, said means to vibrate said elongated members comprising means to discharge a pair of fluid jets respectively over the surfaces of said elongated members, each said fluid jet having a selective fluid flow velocity, each said elongated member having selective dimensions whereby said elongated members are each operative to vibrate at a resonant frequency when subject to said respective fluid jet.